(12) United States Patent
Fontaine et al.

(10) Patent No.: US 9,380,578 B2
(45) Date of Patent: Jun. 28, 2016

(54) METHOD OF ESTABLISHING A FIRST AND A SECOND ASSOCIATION WHICH ARE DECOUPLED

(75) Inventors: Patrick Fontaine, Rennes (FR); Kandaraj Piamrat, Cesson-Sevigne (FR); Renaud Dore, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 112 days.

(21) Appl. No.: 14/115,345

(22) PCT Filed: May 7, 2012

(86) PCT No.: PCT/EP2012/058326
§ 371 (c)(1),
(2), (4) Date: Nov. 2, 2013

(87) PCT Pub. No.: WO2012/152733
PCT Pub. Date: Nov. 15, 2012

(65) Prior Publication Data
US 2014/0064257 A1    Mar. 6, 2014

(30) Foreign Application Priority Data

May 6, 2011   (EP) .................................. 11305543

(51) Int. Cl.
| | | |
|---|---|---|
| H04W 72/04 | (2009.01) | |
| H04W 74/08 | (2009.01) | |
| H04W 76/02 | (2009.01) | |
| H04W 72/12 | (2009.01) | |
| H04B 7/26 | (2006.01) | |

(52) U.S. Cl.
CPC ......... *H04W 72/0446* (2013.01); *H04B 7/2656* (2013.01); *H04W 72/1205* (2013.01); *H04W 74/0816* (2013.01); *H04W 74/0891* (2013.01); *H04W 76/02* (2013.01); *H04W 76/025* (2013.01)

(58) Field of Classification Search
CPC ..................................................... H04W 76/02
USPC ............................................................ 370/336
See application file for complete search history.

(56) References Cited

U.S. PATENT DOCUMENTS

| | | | |
|---|---|---|---|
| 2006/0165103 A1* | 7/2006 | Trudeau et al. | ............... 370/401 |
| 2009/0109936 A1* | 4/2009 | Nagai | ........................... 370/336 |

(Continued)

FOREIGN PATENT DOCUMENTS

| | | |
|---|---|---|
| CN | aN101931954 | 12/2010 |
| JP | 2007266942 | 10/2007 |

(Continued)

OTHER PUBLICATIONS

Heusse et al. Performance Anomaly of 802.11b, LSR-IMAG Laboratory, Grenoble, France, Proc. INFOCOM of IEEE 2003, pp. 836-643.

(Continued)

*Primary Examiner* — Ian N Moore
*Assistant Examiner* — Mewale Ambaye
(74) *Attorney, Agent, or Firm* — Robert D. Shedd; Jerome G. Schaefer

(57) ABSTRACT

A method for establishing a first and second association between a main node and respectively a first and second wireless node is disclosed. The first association associates a first virtual access point VAP1 of the main node and the first node. The first virtual access point transmits to the first node first beacon frames comprising a first item of information BSSID1 representative of the first association BSS1. The first virtual access point VAP1 is identified by a services set identifier SSID. According to the invention, when the main node receives from the node a request for the establishment of the second association BSS2, the method comprises, at controller level, a step of creation of a second virtual access point so as to isolate the transmissions over the associations.

5 Claims, 7 Drawing Sheets

(56) References Cited

U.S. PATENT DOCUMENTS

Figure 1:
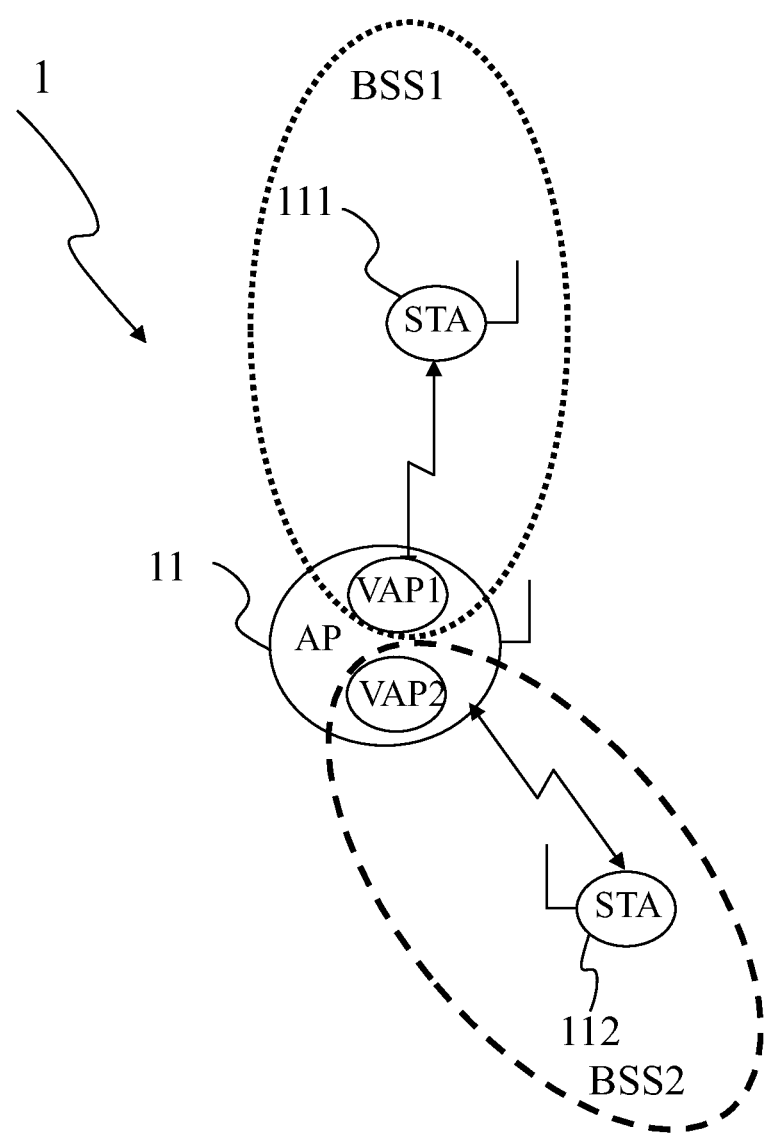

| | | | |
|---|---|---|---|
| 2011/0013608 A1* | 1/2011 | Lee et al. | 370/338 |
| 2011/0040969 A1* | 2/2011 | Yao et al. | 713/168 |

FOREIGN PATENT DOCUMENTS

| | | |
|---|---|---|
| JP | 2010056753 | 3/2010 |
| JP | 2011045104 | 3/2011 |

OTHER PUBLICATIONS

Copy of Search Report Dated Aug. 6, 2012.
Epstein: "WP increasing reliability of virtualized WLAN 0510 v2," Jul. 2009, MERU Networks.
Siradel.com, Volcano Suite 3.0; "An Innovative Approach to Smart City Planning" 2014.
Baron: "Propagation Simulation for NS3", Technicolor Technical Report, Mar. 15, 2011.
IEEE Std 1588-2002: "Standard for a precision clock synchronization protocol for networked measurement and control systems", Nov. 8, 2002.
Nsnam.com, The ns-3 network simulator, Feb. 12, 2015.
Perahia et al: Next Generation Wireless LANs: Throughput, robustness, and reliability in 802.11n, Cambridge University Press, 2008.
LAN/MAN standards Committee. "Part 11: Wireless lan medium access control (mac) and physical layer (phy) specifications." IEEE-SA Standards Board (2003).

* cited by examiner

| Version | Channel (MHz) | Streams | Modulation & Coding | Data Rate (Mb/s) 800 ns GI | Data Rate (Mb/s) 400 ns GI | Sensitivity (dBm) Standard | Sensitivity (dBm) Product |
|---|---|---|---|---|---|---|---|
| 802.11b | 22 | 1 | DBPSK | 1 | | | -90 |
| | | | DQPSK | 2 | | | |
| | | | CCK | 5.5 | | | |
| | | | CCK | 11 | | | |
| 802.11a,g | 20 | 1 | BPSK1/2 | 6 | | -82 | -88 |
| | | | BPSK3/4 | 9 | | -79 | |
| | | | QPSK1/2 | 12 | | -77 | -85 |
| | | | QPSK3/4 | 18 | | -74 | |
| | | | 16-QAM1/2 | 24 | | -70 | |
| | | | 16-QAM3/4 | 36 | | -66 | |
| | | | 64-QAM2/3 | 48 | | -65 | |
| | | | 64-QAM3/4 | 54 | | -64 | -70 |
| 802.11n | 20 | 1 | BPSK1/2 | 6.5 | 7.2 | -82 | -92 |
| | | | QPSK1/2 | 13.0 | 14.4 | -79 | |
| | | | QPSK3/4 | 19.5 | 21.7 | -77 | |
| | | | 16-QAM1/2 | 26.0 | 28.9 | -74 | |
| | | | 16-QAM3/4 | 39.0 | 43.3 | -70 | |
| | | | 64-QAM2/3 | 52.0 | 57.8 | -66 | |
| | | | 64-QAM3/4 | 58.5 | 65.0 | -65 | |
| | | | 64-QAM5/6 | 65.0 | 72.2 | -64 | -74 |
| | 20 | 2 | BPSK1/2 | 13.0 | 14.4 | -82 | -92 |
| | | | QPSK1/2 | 26.0 | 28.9 | -79 | |
| | | | QPSK3/4 | 39.0 | 43.3 | -77 | |
| | | | 16-QAM1/2 | 52.0 | 57.8 | -74 | |
| | | | 16-QAM3/4 | 78.0 | 86.7 | -70 | |
| | | | 64-QAM2/3 | 104.0 | 115.6 | -66 | |
| | | | 64-QAM3/4 | 117.0 | 130.0 | -65 | |
| | | | 64-QAM5/6 | 130.0 | 144.4 | -64 | -74 |
| | 20 | 4 | BPSK1/2 | 26.0 | 28.9 | -82 | |
| | | | QPSK1/2 | 52.0 | 57.8 | -79 | |
| | | | QPSK3/4 | 78.0 | 86.7 | -77 | |
| | | | 16-QAM1/2 | 104.0 | 115.6 | -74 | |
| | | | 16-QAM3/4 | 156.0 | 173.3 | -70 | |
| | | | 64-QAM2/3 | 208.0 | 231.1 | -66 | |
| | | | 64-QAM3/4 | 234.0 | 260.0 | -65 | |
| | | | 64-QAM5/6 | 260.0 | 288.9 | -64 | |
| | 40 | 1 | 16-QAM1/2 | 54.0 | 60.0 | -71 | |
| | | 1 | 64-QAM5/6 | 135 | 150 | -61 | -68 / -73 |
| | | 2 | 16-QAM1/2 | 108.0 | 120.0 | -71 | |
| | | 2 | 64-QAM5/6 | 270.0 | 300.0 | -61 | -68 / -71 |
| | | 4 | 16-QAM1/2 | 216.0 | 240.0 | -71 | |
| | | 4 | 64-QAM5/6 | 540.0 | 600.0 | -61 | |

Table 1: Data bit rates and sensitivity according to the modulation physical mode

Fig. 7

US 9,380,578 B2

METHOD OF ESTABLISHING A FIRST AND A SECOND ASSOCIATION WHICH ARE DECOUPLED

This application claims the benefit, under 35 U.S.C. §365 of International Application PCT/EP2012/058326, filed May 7, 2012, which was published in accordance with PCT Article 21(2) on Nov. 15, 2012 in French and which claims the benefit of European patent application No. 113055418, filed May 6, 2011.

1. DOMAIN OF THE INVENTION

The invention relates to the telecommunications domain and more specifically to the management of a local wired or wireless network comprising at least two wireless nodes.

2. PRIOR ART

According to the prior art, several architectures of WLAN (Wireless Local Area Network) or LAN (Local Area Network) networks are known. Some of them use a single access point to cover a space such as a house or the floor of a building by use for example of a heightened transmission power associated with various sophisticated technologies such as MIMO (Multiple Input Multiple Output) or OFDM (Orthogonal Frequency Division Multiplexing). Thus, a Wi-Fi® (based on the standard 802.11n) network access point attains a real bit rate of 100 Mbits/s within a radius of 90 meters using MIMO and OFDM technologies and an access point to a HiperLAN2 network attains a bit rate of 50 Mbits/s within a radius of 45 meters. Such architectures based on a single access point present the disadvantage of producing a high level of interferences with respect to the neighbouring area and the risk of not covering the entire space to be covered, particularly in some zones separated from the access point by physical obstacles, such as walls or panels causing strong attenuations of the signal transmitted. Moreover, the use of a heightened transmission power raises questions of public health relating to the risks linked to prolonged exposure to electromagnetic radiation.

Heusse et al. in "Performance anomaly of 802.11b" in Proc. of IEEE INFOCOM 2003 noted that, when some nodes connected to a same access point have a lower bit rate than the others, the performance of all of the nodes is degraded overall even if they are situated close to the access point. Such situations are frequently encountered in wireless local networks within which the signal transmitted by a node placed very far from the access point is subject to interferences.

To overcome this problem, the node modifies its modulation type, which degrades the bit rate of its connection. As a general rule, nodes in accordance with the standard 802.11b degrade their bit rate progressively from 11 Mb/s to 5.5 or 1 Mb/s when transmission failures are detected. In such a situation, this reduction of the bit rate impacts on the bit rate of all the other transmission nodes due to the method of access to the CSMA/CA channel that guarantees long term equality of the probability of access to the channel for all the nodes. When a node phagocytes the channel over a long period because its bit rate is slow, it penalizes the other nodes that have a higher bit rate.

Solutions exist to resolve this problem when the data are only transmitted via the access point (that is to say in downlink only) or when a scheduler carries out a temporal multiplexing, coordinates the various nodes and removes the zones of contention: this is the case for example for the standard 802.16 or the PCF mode of the standard 802.11.

The invention is situated in the context of a wired or wireless CSMA network where at least 2 wireless nodes seek both to transmit data to a same access point (that is to say in uplink) and must share the same channel to do so. In fact, if a scheduler is able to coordinate the downlink data transmissions using different access points, the scheduler is not able to coordinate the uplink data transmissions. In the case of an uplink data transmission, a wireless node can monopolize the resource, thus blocking all of the other communications. Among the networks implementing a random type method for accessing the channel, it is possible to cite for the wired networks: GNeT using CSMA/CA, Apples LocalTalk using CSMA/CA, Ethernet (based on the standard IEEE 802.3) using CSMA/CD (Carrier Sense Access with Collision Detection) or ITU-T H.hn using CSMA/CA, and for the wireless networks: the Wi-Fi® network (based on the standard IEEE 802.11-2007) using CSMA/CA, WPAN (Wireless Personal Area Network) wireless personal network, based on the standard IEEE 802.15 using CSMA/CA or WaveLAN using CSMA/CA.

3. SUMMARY OF THE INVENTION

The purpose of the invention is to overcome the disadvantages of the prior art.

More specifically, the purpose of the invention is to isolate the streams of traffic in such a way that a degradation of the link between a main node (or access point) and a first node does not degrade the links between this main node and the other nodes of the network, particularly in the scope of adaptive streaming communications based on the http standard. To do this, the main node will be decoupled from as many virtual access points as links, a controller carrying out the sharing of the access to the medium according to requirements in bandwidth (or bit rate) expressed by each of the clients, of the modulation used or again of the stream type to be transmitted requiring a guaranteed quality of service or satisfying a best effort mode. The sharing is carried out at the level of the access point by means of evaluations of periods during which each client is configured to communicate while the other clients remain silent. The duration of these periods is determined using knowledge of the total available bit rate, the duration of the frame and the bit rate available at the level of each client and is notably a function of the modulation rate employed and the required bit rate per data stream.

The invention relates to a method for establishing a first and second association between a main node 11 and respectively a first and second wireless node 111, 112, the first association associating a first virtual access point VAP1 of the main node 11 and the first node 111, the first virtual access point VAP1 sending the first node 111 first beacon frames 411 comprising a first item of information BSSID1 representative of said first association BSS1, the first virtual access point VAP1 being identified by a services set identifier SSID.

According to the invention, when the main node 11 receives from the node 112 a request for the establishment of the second association BSS2, the method comprises, at the level of a controller, steps for:

collecting parameters of the first and second association,
creating a second virtual access point VAP2 of the main node 11 sending to the second node 112 second beacon frames 421 comprising a second item of information BSSID2 representative of said second association, said second virtual access point VAP2 being identified by the services set identifier SSID,
estimating from said parameters, a first and a second temporal interval 42, 41 during which respectively the first node 111 and the first virtual access point VAP1 on one hand, the second node 112 and the second virtual access point VAP2 are prohibited from sending, establishing of the second association between the second node 112 and the second virtual access point VAP2, transmitting, to the first and second node 111, 112 at least one item of quiet information representative of a prohibition to send 410, 420 during the first or second temporal interval 42, 41.

Advantageously, a first and second data transmission bit rate dr1, dr2 practised by the first and second node linked to the physical modulation employed respectively by the first and second node 111, 112 in the first and second association, and a first and second data transmission bit rate DR1, DR2 required by respectively the first and second node 111, 112 according to the nature of data transmitted in the first and second association are collected parameters.

Advantageously, the controller sets a frame duration and the first and second temporal intervals 42, 41 have a duration proportional to the duration of said frame and proportional with respect to the first data transmission bit rate dr1 practised by the first node 111 and the first data transmission bit rate DR1 required by the first node 111 and with respect to the second data transmission bit rate DR2 required by the second node 112.

Advantageously, a total data transmission bit rate dr practised by the first and second node linked to the physical modulation employed respectively by the first and second node 111, 112 in the first and second association, and a first and second data transmission bit rate DR1, DR2 required by respectively the first and second node 111, 112 according to the nature of data transmitted in the first and second association are collected parameters. Advantageously, the controller sets a frame duration and the second and the first temporal intervals 42, 43 have a duration proportional to the duration of said frame and proportional to the first data transmission bit rate DR1 required by the first node 111 related to the total data transmission bit rate practised and related to the second data transmission bit rate DR2 required by the second node 112 related to the total data transmission bit rate practised.

Advantageously, the main node 11 is an access point, and the first and second nodes 111, 112 are associated with the access point.

Advantageously, the item of silence information is comprised in at least one silence element 56 of a beacon frame 411, 421.

One of the advantages of the invention is that it enables data exchanges from several nodes to be decoupled. In particular, the quality of the link between a client and an access point is not a function of the quality of links between this access point and other clients.

In addition the invention enables an access point in a wireless CSMA network to allocate bandwidth to its clients.

The invention can be implemented by an update of the firmware or of the access points driver, in particular it can be deployed on existing access points.

Finally, the invention is directly compatible with wireless stations supporting the standard 802.11h (obligatory in the 5 GHz band).

4. LIST OF FIGURES

Figure 2:
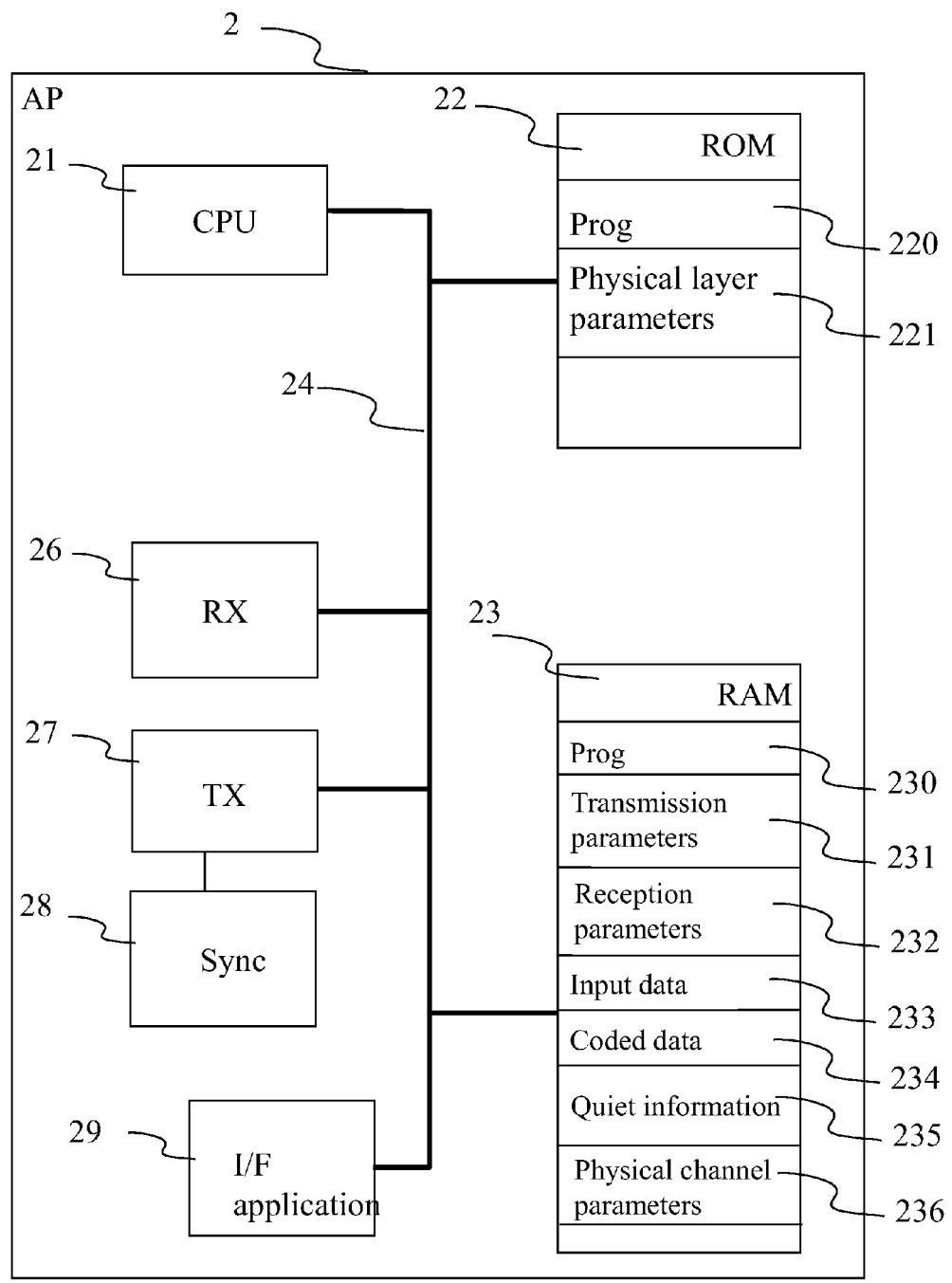
Figure 3:
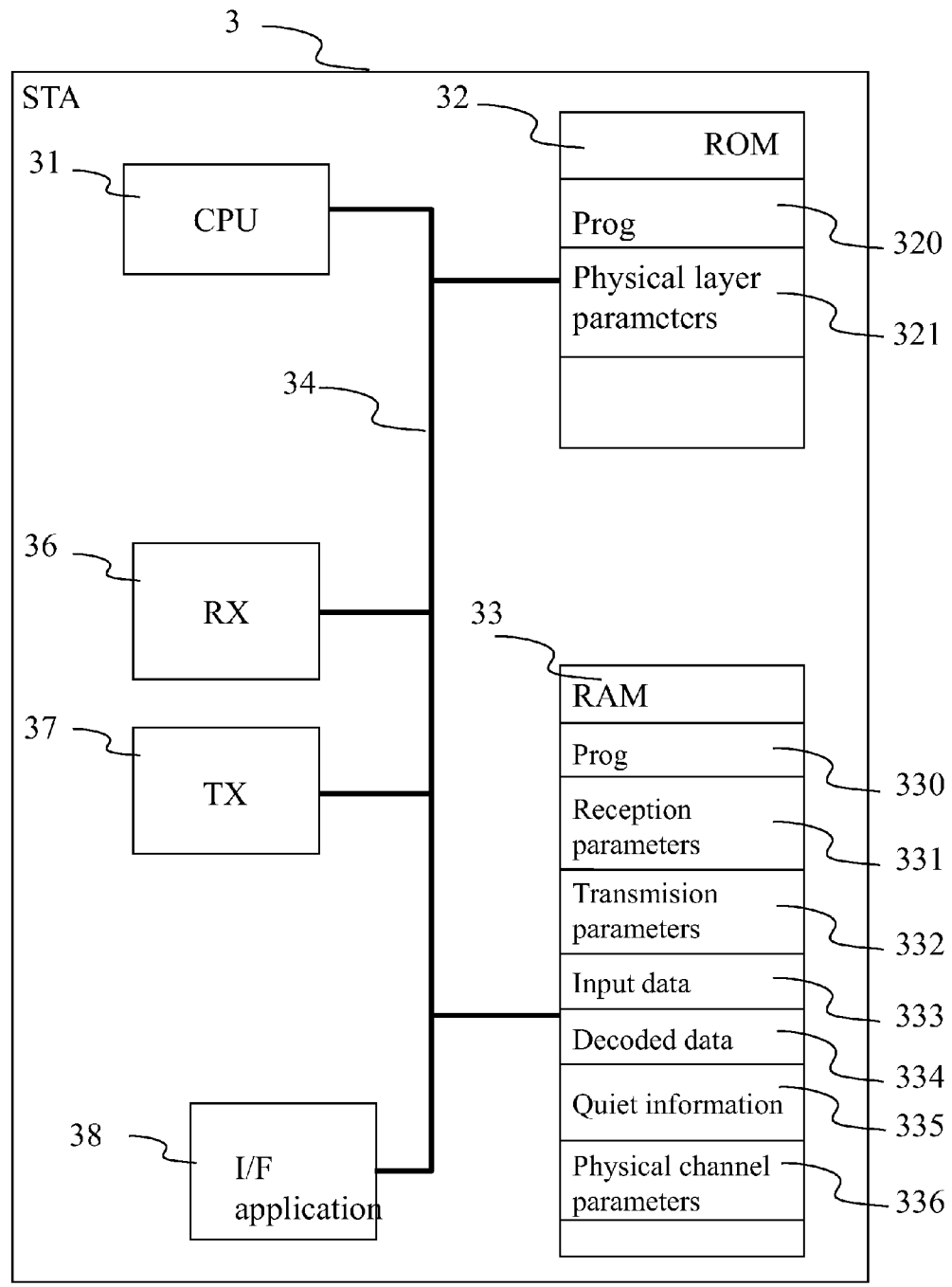
Figure 4:
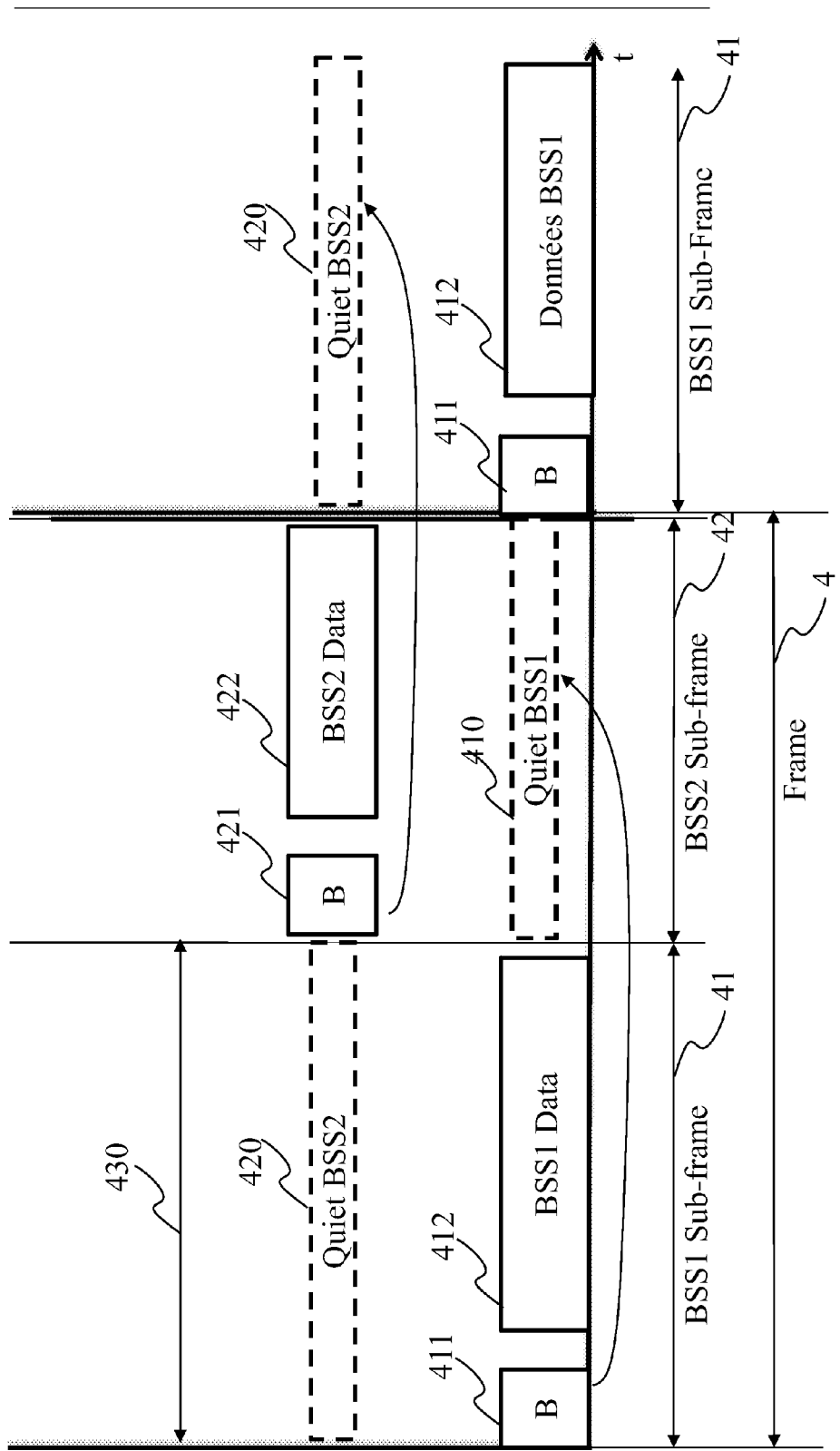
Figure 5:
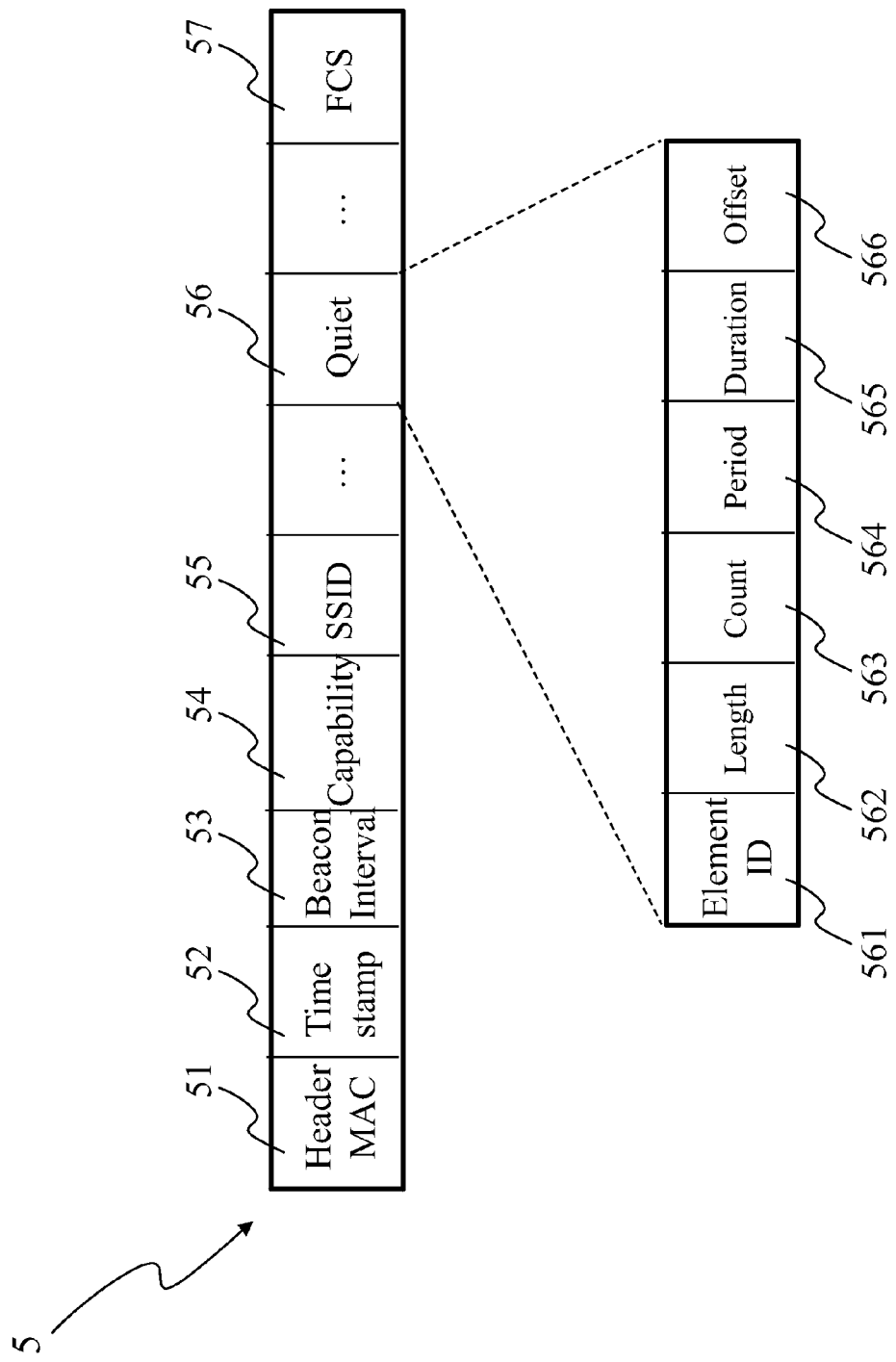
Figure 6:
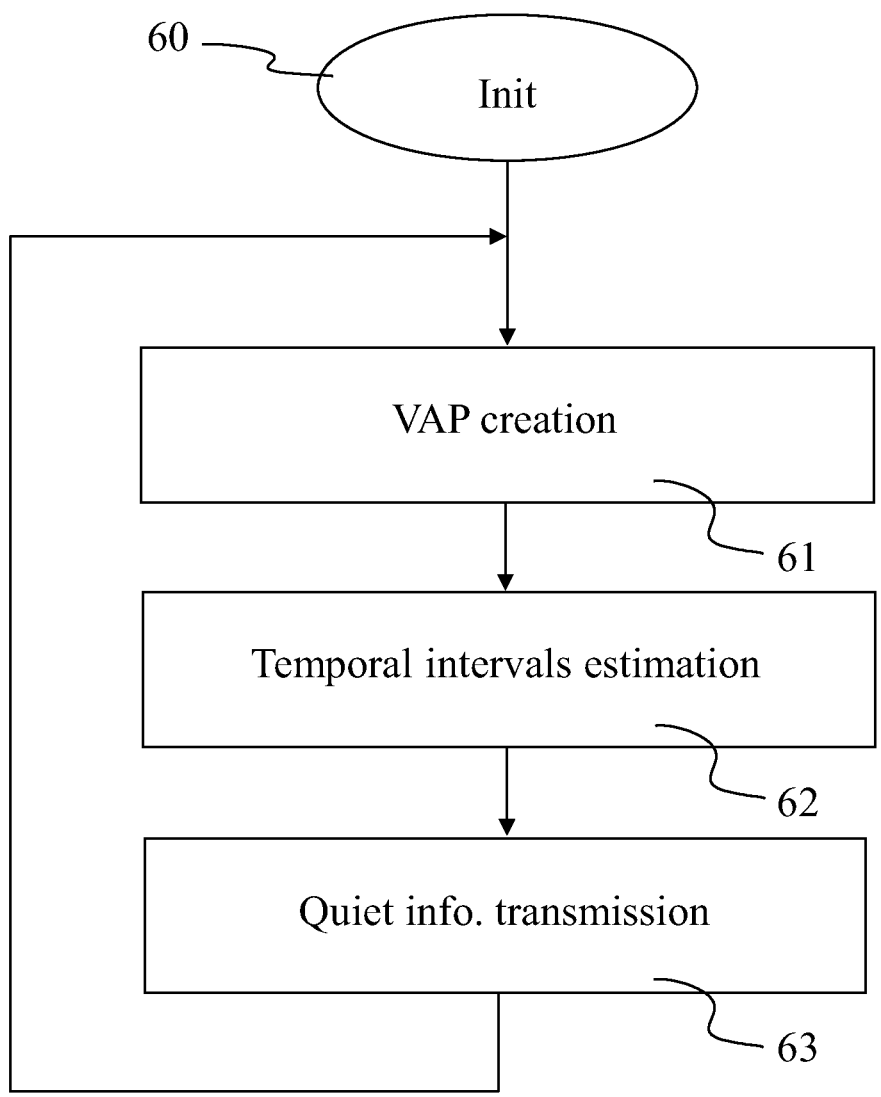

The invention will be better understood, and other specific features and advantages will emerge upon reading the following description, the description making reference to the annexed drawings wherein:

FIG. 1 shows a wireless system implementing several virtual access points in an access point associated with several stations, according to a particular embodiment of the invention, FIGS. 2 and 3 diagrammatically illustrate respectively an access point and a station of the system of FIG. 1, according to a particular embodiment of the invention, FIG. 4 diagrammatically shows the structure of a communication frame of the system of FIG. 1, according to a particular embodiment of the invention, FIG. 5 diagrammatically shows the content of a beacon frame transmitted by at least one node of the system of FIG. 1, according to a particular embodiment of the invention, FIG. 6 shows a method for establishing a first and a second association decoupled between a main node and a first and second node respectively according to a particular embodiment of the invention, FIG. 7 is a table presenting different data bit rates of a node of a wireless system according to the modulation physical mode.

5. DETAILED DESCRIPTION OF EMBODIMENTS OF THE INVENTION

The invention will now be described, in a non-restrictive manner, according to a particular embodiment implementing a Wi-Fi type wireless local network (referring to the standards IEEE 802.11a, IEEE 802.11b, IEEE 802.11d, IEEE 802.11e, IEEE 802.11g, IEEE 802.11h, IEEE 802.11i, IEEE 802.11j (edited by the IEEE under the reference IEEE 802.11TM-2007 with the title "IEEE Standard for Information technology—telecommunications and information exchange between systems—Local and metropolitan area networks—Specific requirements/Part 11: Wireless LAN Medium Access Control (MAC) and Physical Layer (PHY) Specifications") or IEEE 802.11n). Naturally the invention is not limited to an implementation in a wireless network of Wi-Fi® type, the principles of the invention being applied by those skilled in the art to any type of local wired or wireless network using a partially random type channel access method, for example of type ALOHA, CSMA, CSMA/CA or CSMA/CD, for example a wired local network of type GNeT, Apple's LocalTalk, Ethernet (based on the standard IEEE 802.3), ITU-T G.hn or a wireless local network of type WPAN (based on the standard IEEE 802.15), WaveLAN or ALOHAnet.

In order to reduce collisions, the antenna time in a network is divided into n partitions, n corresponding to the number of nodes in the network. Equality between the different nodes is guaranteed as each node will have a dedicated time corresponding to that required at the transmission of its traffic using the highest modulation. The hypothesis is made of a non-saturated network where the overall traffic (when it is transmitted at the highest bit rate) does not exceed the maximum capacity of the network. Each time partition corresponds to a virtual local network managed by a virtual access point, its implementation is described hereafter in the description.

The implementation of the channel allocation and the protection of this is carried out via a Quiet Element (noted as QE) available in the standard. This element, transmitted via the beacon frame, enables a virtual access point to prohibit all transmissions to its stations during a time interval allocated to other virtual access points. The beacon frames of each BSS can comprise several quiet elements. Hence as shown in FIG. 4, two quiet elements 410, 420 are used to create two subframes in a beacon interval (time between the transmission of two beacons). If the transmissions of beacon frames are offset (between the two BSS), the quiet intervals are always synchronized. And if the transmission of beacon frames was also delayed by a busy channel, the quiet intervals still remain synchronized as the quiet intervals are defined relative to the TBTT (Target Beacon Transmission Time).

FIG. 1 shows a wireless communication system 1 of wireless local network type according to a particular embodiment of the invention, implementing several nodes. In network infrastructure mode, the node 11 acts as a mobile or fixed access point and the other nodes 111, 112 act as fixed or mobile stations. The station 111 is associated with the access point 11 for communication (that is to say transmission and/or reception) of data and forms with the access point 11 a first BSS (Basic Service Set) 1. This association is produced by a first virtual access point VAP1 comprised in the access point 11. The association between the station 111 and the virtual access point VAP1 or the station and virtual access point set are used in the same way hereafter in the description and are referred to as BSS1. An information element BSSID1 Basic Service Set IDentifier representative of this first association BSS1 is transmitted in the beacon frames transmitted by the first virtual access point VAP1. The station 112 is associated with the access point 11 for the communication of data and forms with the access point 11 a second set BSS 2. This association is produced by a second virtual access point VAP2 also comprised in the access point 11. An information element BSSID2 representative of this second association is transmitted in the beacon frames transmitted by the second virtual access point VAP2.

The two sets BSS 1 and BSS 2 are natively connected in the access point 11 to form an ESS (Extended Service Set). An SSID (Service Set IDentifier) information element representative of the set comprising BSS 1 and BSS 2 that represents the name of the wireless system 1, is also transmitted in the beacon frames transmitted via the virtual access points VAP1, VAP2.

The station 111, respectively 112 is able to exchange (send or receive) data (or data packets) with the virtual access point VAP1, respectively VAP2 with which it forms the BSS 1, respectively BSS 2. Advantageously, a BSS uses a particular physical channel to exchange data, a physical channel being characterized by a group of parameters comprising a list of sub-carriers, a time interval, an interference level and in the case of a CDMA (Code Division Multiple Access) access a same spread code.

The 5 GHz band corresponds for example to the frequency bands for which all the frequencies are comprised between 5.15 GHz and 5.35 GHz or comprised between 5.47 GHz and 5.875 GHz. A 5 GHz physical channel corresponds to a channel of width 10, 20, or 40 MHz for example, for which all the frequencies are situated in one of the frequency intervals mentioned above. The 2.4 GHz band corresponds for example to the frequency bands for which all the frequencies are comprised between 2.4 GHz and 2.5 GHz. A 2.4 GHz physical channel corresponds to a channel of width 10, 20, or 22 MHz for example, for which all the frequencies are situated in one of the frequency intervals mentioned above.

Advantageously, particularly in the case of a CSMA access that does not provide a mechanism for coordination of data exchanges but rather a random access to the physical channel, the sharing of the physical channel to exchange downlink or uplink data is carried out via a temporal division of the channel according to the different bit rates required for each link. The implementation of this temporal division comprises the definition of quiet elements 410, 420 available in the standard. A quiet element, belonging to the beacon frame, enables a virtual access point (VAP) to prohibit any transmission of data from the virtual access point to the station with which it is associated and from the station to this virtual access point during the time reserved for other virtual access points. The definition of quiet temporal intervals of virtual access points and the corresponding beacon frame sent by the virtual access point will be listed in reference to FIGS. 4 and 5.

Advantageously, the access point 11 of the system 1 is a fixed device. However, the invention is compatible with a mobile access point 11.

Stations 111 to 112 can be either mobile or fixed stations, for example a mobile telephone, a mobile terminal, a laptop, a PC (Personal Computer) or a PDA (Personal Digital Assistant).

FIG. 2 diagrammatically shows a hardware embodiment of an access point 2 corresponding for example to the node 11 of FIG. 1.

The access point 2 comprises the following elements, connected to each other by a bus 24 of addresses and data that also transports a clock signal:
- a microprocessor 21 (or CPU),
- a non-volatile memory of ROM (Read Only Memory) type 22,
- a Random Access Memory or RAM 23,
- a radio interface 26,
- an interface 27 adapted for the transmission of data (for example broadcasting of services or multipoint to point or point to point transmission) and performing notably the functions of a coder and/or OFDM modulators,
- an interface 28 adapted to calculate a synchronization offset between the virtual access points that is to say between the beacon frame time references BSS 1 and BSS 2, and to synchronize the interface 27, and/or
- a MMI (Man Machine Interface) interface 29 or to a specific application suitable for displaying information for a user and/or inputting data or parameters (for example the setting of parameters of sub-carriers and of data to be transmitted).

It is noted that the word "register" used in the description of memories 22 and 23 designates in each of the memories mentioned, both a memory zone of low capacity (some binary data) as well as a memory zone of large capacity (enabling a whole programme to be stored or all or part of the data representative of data received or to be broadcast).

The memory ROM 22 comprises notably:
- a "prog" 220 program, and
- parameters 221 of physical layers.

The algorithms implementing the steps of the method specific to the invention and described below are stored in the ROM 22 memory associated with the access point 2 implementing these steps. When powered up, the microprocessor 21 loads and runs the instructions of these algorithms.

The random access memory 23 notably comprises:
- in a register 230, the operating programme of the microprocessor 21 responsible for switching on the access point 2.
- transmission parameters 231 (for example parameters for modulation, for coding, for frames recurrence, a table with the time allocated to each station and possibly other parameters (stream type, station identifier, MAC address, required bit rate and priority)),
- the reception parameters 232 (for example parameters for modulation, coding and recurrence of frames),
- input data 233,
- coded data 234 for transmission of data,
- an item of quiet information 235, and
- parameters of the physical channel 236 (for example the allocation of determined temporal intervals, of a determined code and/or intervals of sub-carriers determined at the transmission of the data by the access point 2).

The radio interface 26 is adapted for the reception of signals transmitted if necessary by the nodes 111 or 112 of the system 1.

The controller carrying out the allocation of virtual access points to the different stations and estimating the temporal share of the medium is advantageously implemented by means of an application in the processor 21. The virtual access points are also advantageously implemented by means of an application in the processor 21.

FIG. 3 diagrammatically shows a hardware embodiment of a station 3 belonging to the system 1, corresponding for example to the node 111 or 112 and adapted to receive and decode the signals transmitted via the access point 2, to transmit signals to the access point 2.

The station 3 comprises the following elements, connected to each other by a bus 34 of addresses and data that also transports a clock signal:
- a microprocessor 31 (or CPU),
- a non-volatile memory of ROM (Read Only Memory) type 32,
- a Random Access Memory or RAM 33,
- a radio interface 36, and
- an interface 37 adapted for the transmission of data, and
- an MMI interface 38 adapted for displaying information for a user and/or inputting data or parameters (for example the setting of parameters of sub-carriers and data transmitted).

It is noted that the word "register" used in the description of memories 32 and 33 designates in each of the memories mentioned, a memory zone of low capacity as well as a memory zone of large capacity (enabling a whole programme to be stored or all or part of the data representing data sets received or decoded).

The memory ROM 32 comprises notably:
- a "prog" 320 program, and
- parameters 321 of physical layers.

The algorithms implementing the steps of the method specific to the invention and described hereafter are stored in the ROM 32 memory associated with the station 3 implementing these steps. When powered up, the microprocessor 31 loads and runs the instructions of these algorithms.

The random access memory 33 notably comprises:
- in a register 330, the operating programme of the microprocessor 31 responsible for switching on the mobile terminal 3,
- the reception parameters 331 (for example parameters for modulation, coding and recurrence of frames),
- transmission parameters 332 (for example parameters for modulation, coding and recurrence of frames),
- incoming data 333 corresponding to the data received and decoded by the receiver 36,
- decoded data 334 formed to be transmitted at the interface to the application 39,
- an item of quiet information 235, and
- physical channel parameters 236 (for example allocation of a determined frequency band, of a code determined at the transmission of data).

Other structures of access point 2 and/or of the station 3 than those described with respect to the FIGS. 2 and 3 are compatible with the invention. In particular, according to variants, access points and/or mobile terminals compatible with the invention are implemented according to a purely hardware embodiment, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a combination of hardware elements and software elements.

The radio interface 36 is suitable for the reception of signals transmitted by the node 11 of the system 1.

FIG. 4 diagrammatically shows the structure of a communication frame of the system 1, according to a particularly advantageous non-restrictive embodiment of the invention.

The communication frame 4 is temporally divided into two sub-frames 41, 42, each sub-frame being allocated to communications establishing themselves between the nodes of a given BSS. In the case of a network in infrastructure mode, each sub-frame is allocated to the access point of each BSS. In the system 1, the sub-frame 41 is allocated to the virtual access point VAP1 of BSS1 and the sub-frame 42 is allocated to the virtual access point VAP2 of BSS2. In each sub-frame, the nodes of the BSS (namely the virtual access point and the station that is associated with it) use MAC standard mechanisms of the standard IEEE 802.11-2007 known to those skilled in the art: mechanisms of the CSMA/CA with for example the use of RTS/CTS frames to reserve the channel, the "backoff", Quality of Service QoS EDCA, A-MPDU, ACK frames reception acknowledgement block, etc. or any other mechanism described in the standard IEEE 802.11-2007. Advantageously, the allocation of temporal frames of the communication frame to the BSS is carried out by the controller. The controller is for example implemented in the access point 11 of the ESS network of the system 1 beside the virtual access points. Each virtual access point of the ESS network comprising two BSS receives from the controller an item of information representative of the allocation of sub-frames. According to a variant, one of the virtual access points of the ESS network operates as a controller and transmits the information representative of the allocation to other virtual access points. According to another variant, the allocation of sub-frames is registered in the memory of each virtual access point of BSS1 and BSS2, for example by a manager user of the network.

During the first sub-frame 41, the virtual access point VAP1 of BSS1 transmits a beacon frame 411 intended for the station 111 that it is associated with. The beacon frame advantageously comprises an item of quiet information representative of the prohibition to transmit during the sub-frame 42 allocated to BSS2. On reception of this prohibition to transmit during the sub-frame 42, the station 111 positions its network allocation vector (in accordance with the standard IEEE 802.11-2007) NAV (Network Allocation Vector), thus prohibiting any transmission of data during the temporal interval(s) corresponding to the sub-frame 42. The virtual access point VAP1 also positions its NAV during the same temporal interval(s). The communication of data between the virtual access point VAP1, thus the access point 11, on one hand and the station 111 on the other hand is carried out during the interval(s) 412 and a quiet element 410 is imposed on the nodes of BSS1 during the temporal intervals allocated to the sub-frame 42.

During the second sub-frame 42, the virtual access point VAP2 of BSS2 transmits a beacon frame 421 intended for the station 112 that it is associated with. The beacon frame 421 advantageously comprises an item of quiet information representative of the prohibition to transmit during the sub-frame 41 allocated to BSS1. On reception of this prohibition to transmit during the sub-frame 41, the virtual access point VAP2 and the station 112 each position their network allocation vector NAV, thus prohibiting them from any transmission of data during the temporal intervals corresponding to the sub-frames 41. The communication of data between the virtual access point VAP2, thus the access point 11, on one hand and the station 112 on the other hand is carried out during the temporal interval(s) 422 and a quiet element 420 is imposed on the nodes of BSS2 during the temporal intervals of the sub-frame 41.

FIG. 5 diagrammatically shows the content of a beacon frame according to a particularly advantageous non-restrictive embodiment of the invention.

Advantageously the beacon frame 5 is in accordance with the standard 802.11-2007. The MAC (Medium Access Control Header) field 51 contains an item of information representative of source and destination MAC addresses, the destination address being for example configured to all the addresses of stations (corresponding to a broadcast type address) of the BSS considered to force all the stations of the BSS considered to receive and process each beacon frame. The field header MAC 51 also comprises for example the type and the sub-type of the frame (for example type=management frame, sub-type=beacon) or again the identifier of the BSS BSSID comprising the virtual access point transmitting the beacon frame (corresponding for example to the source address, that is to say the address at the virtual access point transmitting the beacon frame).

The body of the beacon frame comprises all the fields placed between the MAC header and an FCS (Frame Check Sequence) field. The Timestamp field 52 comprises an item of information representative of a time used by a station to update its local clock. This information enables stations associated with the beacon frame transmitter access point to synchronize. The Beacon Interval field 53 comprises an item of information representative to the duration elapsing between the transmission of two beacon frames. This information particularly enables stations desiring to go on standby to know when they should go into listening state to receive the beacon frame. The beacon interval can for example be configured at 100 TU (time units), that is to say at 100*1024 µs=102.4 ms.

The Capability Information field 54 comprises an item of information representative of prerequisites required to a station to belong to the BSS comprising the access point that transmitted the beacon frame, such as for example the necessity to use a WEP (Wired Equivalent Privacy) key to participate in the network or again for example an item of information representative of the support for the management of the DFS (Dynamic Frequency Selection) spectrum. To indicate the support of the spectrum management, the field capability 54 comprises an item of spectrum management support information translating for example as a Spectrum Management bit positioned at 1. A station receiving this information must position dot11SpectrumManagementRequired at true before associating itself with the access point having transmitted the beacon frame. If a station does not support spectrum management, then it cannot associate with the BSS considered.

The SSID (Service Set IDentifier) field comprises an item of information representative of the identification of the BSS comprising the transmitter access point of the beacon frame. Before being able to associate with a particular BSS, a station must have the same SSID as the virtual access point. The virtual access point then includes by default the SSID in the beacon frame that it transmits.

The quiet field 56 comprises an item of information representative of a quiet element, that is to say an item of information prohibiting the virtual access point and the station belonging to a same BSS transmitting data or data packets during one or several given temporal intervals of one or several communication frames of a network. The quiet field comprises several fields, including:

an "element ID" field 561 comprising an item of information representative of the quiet element identifier, a quiet element being identified by the ID 40 in the standard 802.11-2007, a "Length" field 562 comprising an item of information representative of the cumulated length (in bytes) of fields following the length field and specific to the quiet element, this length being 8 bytes according to the standard 802.11-2007, as well as four fields specific to a quiet element:

a "Counter" field 563 comprising an item of information representative of the number of TBTT until the next beacon interval during which the quiet interval begins. a value of 1 for the "Counter" field signifies that the next quiet interval will start during the beacon interval following the next TBTT, that is to say following the first TBTT positioned after the transmission of the beacon frame describing the quiet element considered, a "Period" field 564 comprising an item of information representative of the number of beacon intervals between two quiet intervals corresponding to a quiet element of a same BSS, a "Duration" field 565 comprising an item of information representative of the duration of a quiet interval represented for example by a number of time units TU, for example 44 TU, or 44*1024 µs=45.056 ms. This duration corresponds to the duration during which the virtual access point and the station(s) of a given BSS cannot transmit data, and an "Offset" field 566 comprising an item of information representative of the temporal offset, expressed in time units TU, existing between the start of the quiet interval and the TBTT (Target Beacon Transmission Time) frame, the TBTT considered being specified in the "Counter" field 563.

Advantageously, the beacon frame 5 describes several quiet elements (for example 2, 3, 5, 10 or 20), that is to say the frame 5 comprises several quiet fields, each quiet field comprising an item of information representative of a quiet element. Each quiet field being associated with a single quiet element, the beacon frame 5 comprises as many quiet fields as there are quiet elements described in the beacon frame. When a communication frame of a network comprising for example 2 BSS is for example divided into 10 sub-frames, 5 sub-frames being allocated to each BSS, the beacon frame transmitted by the first BSS comprises for example five quiet fields for the description of five quiet elements each corresponding to one of the five sub-frames allocated to the communication of the second BSS and the beacon frame transmitted by the second BSS comprises for example five quiet fields for the description of five quiet elements each corresponding to one of the five sub-frames allocated to the communication of the first BSS.

The beacon frame 5 also comprises an FCS (Frame Check Sequence) field or a CRC (Cyclic Redundancy Checking) field used for the correction and the detection of errors.

Advantageously, each beacon frame transmitted by a virtual access point comprises the description of the quiet element(s).

FIG. 6 shows a method for establishing a first and a second association between a main node and respectively a first and second wireless node, implemented by the main node of system 1, according to a particularly advantageous, non-restrictive embodiment of the invention.

During an initialisation step 60, the different parameters of the main node are updated. In particular, the parameters corresponding to the signals to be transmitted or received and to the corresponding channels are initialised in any manner (for example, following the reception of initialisation messages transmitted by one of the nodes of the network, known as master node or by an access point of the network or by a controller or a server not represented of system 1, or by operator commands).

Then, during a step 61, a plurality of virtual access points are created. According to a first variant, a first virtual access point VAP1 is created in the access point 11. The first station 111 is associated with this virtual access point and forms with it a set BSS 1 identified by its BSSID1. The second virtual access point VAP2 is created later when the access point 11 receives a request to establish a second association via a station 112. The sets BSS1 and BSS2 advantageously belong to the same network identified by its SSID. According to a second variant, the virtual access points VAP1 and VAP2 are created when the access point 11 receives a request for the establishment of a second association. The access point 11 is then transformed into a first virtual access point VAP1. According to a third variant, a set of virtual access points are created simultaneously after the initialization phase thus forming a provision of virtual access points available for the association establishment requests to come. According to an advantageous embodiment, as many virtual access points, and thus BSS are created as there are stations to be isolated. In a variant, a single station is isolated from other stations. This variant is particularly well adapted to an environment in which it is sought to guarantee the quality of service via for example a TV stream. Hence, a VAP1 will be created and associated with several stations that share the access to the medium during a determined temporal interval, forming a set BSS1. In this set BSS1, the problems of collision or degradation of links can occur. A VAP2 will be created and associated with a single station, in the example it is that of the TV stream. Advantageously this station is isolated from other stations and not affected by the collisions or links degradation in the BSS1, that has an interval. The quality of service for the TV stream is thus guaranteed in that the link between the VAP2 and the station is not degraded. In another variant, the access point is considered as a station and is isolated from other stations grouped together into a same set BSS. This variant has the advantage of enabling the streams of downlink communications to be isolated from the access point of the streams of uplink communication of stations. According to an advantageous embodiment, the access point (or the controller of the access point) decides on which VAP the station will be associated.

Then, during a step 62, an estimation of temporal intervals reserved for each of the BSS is carried out using parameters of the first and second association. The parameters gathered for each association belong to the group comprising:

the requirements in bandwidth (or bit rate DR1, DR2) expressed (or required) by each of the stations,
the actual available (or practiced) bandwidth (or bit rate dr1, dr2) on the channel linked to the physical modulation used,
the total bandwidth or total remaining bandwidth,
a predefined modulation,
the modulation actually used between a virtual access point and a station,
the nature of the stream to be transmitted for example a TV stream requiring a guaranteed quality of service or for example a stream of pure data satisfying a best effort transmission mode,
the stream priority.

According to a variant, the group of parameters to estimate the reserved access time (or by extension the quiet time of other stations) of each of the stations only comprises one or two parameters listed above. According to another variant, the group of parameters to estimate the access time is a combination of at least two parameters of the group defined above, for example the ratio between the actual bit rate and the required bit rate of first and second associations namely DR1/dr1 and DR/dr2. The access time of BSS1 is for example proportional DR1/dr1. The quiet time of BSS2 is then proportional to (1−DR1/dr1) in the case of two BSS sets. The access time of BSS2 is for example proportional DR2/dr2. The quiet time of BSS2 is then proportional to (1−DR1/dr1) in the case of two BSS sets. According to another variant wherein the clients are adapted to communicate with an identical modulation (dr1=dr2=dr), the access time is calculated according to a predefined modulation. For example for the calculation, the modulation authorizing the highest bit rate is selected as the predefined modulation. Different bit rates available according to modulation are thus shown on FIG. 7. Thus the total bandwidth or total remaining bandwidth is calculated according to this predefined modulation. In addition the DR required bit rate, that is to say the bandwidth to be allocated to the station is calculated according to the bet rate required for a transporter of video data, to which is added the transport data (MAC/and physical layers) of the video. The time to allocate to a client is then equal to the ratio of the required bit rate for the client over the total bit rate relative to the total time ((DR1/dr)*T). The quiet temporal interval is then (1−DR1/dr)*T.

The controller determines a frame duration of temporal sharing of access to the medium (TDMA frame) according to times calculated. The controller divides the frame into temporal intervals that are allocated to the BSS. That is to say the controller determines the time intervals where it will prohibit a station from transmitting thus the time intervals allocated to the other stations. The access time is that reserved to a BSS (thus its stations).

According to a variant, the parameters are fixed (for example the same bit rate is required towards a same station), the temporal intervals can then be fixed at the start.

Advantageously, the access point or the controller maintains a table with the time allocated to each station and possibly other parameters (stream type, station identifier, MAC address, required bit rate, priority, etc.). When a first station 111 associates with a first virtual access point VAP1, the controller estimates the access time to the medium that it will reserve at the first station 111 for its transmissions including the transmission to the station and the receptions from the station (downlink and uplink data). Then when a second station 112 wants to associate with the access point, the controller again calculates the access time allocated to each station 111, 112, subtracting the quiet time for the other stations and updates the table (intervals, quiet element, etc.). Thus the method according to the invention is advantageously dynamic and adapts to the requests for establishment of association on the access point 11.

Finally, during a step 63, the access point transmits an item of quiet information intended for one or several associated nodes in the BSS. The AP (or rather the VAPs) constructs packets of beacon frames that contain transmission prohibition information (quiet elements). This quiet information comprises an item of information representative of a prohibition to transmit data or packets of data during one or several temporal intervals allocated to one or several stations of a second BSS set. The access point converts the time intervals into quiet elements that it will insert into the beacon frames.

A quiet element allows a BSS to be prohibited from transmitting during a time interval. The time interval of the quiet element is referenced with respect to the TBTT (Target Beacon Transmission Time) of the next beacon. In addition, the temporal intervals of 2 distinct BSS are referenced with respect to the target beacon transmission time (TBTT) of the first beacon 411. Hence, the quiet interval 410 of the beacon frame of BSS1 will be referenced with respect to a TBTT of the beacon 411. The quiet interval 420 of the beacon frame BSS2 will be referenced with respect to a TBTT of the beacon 421. It serves then to correct the reference of the quiet element 420 of a synchronization offset 430. According to a variant not shown in FIG. 4, a frame comprising a beacon frame comprises several quiet elements for which a same station is prohibited from access to the channel. Conversely, a frame can comprise several time intervals 412, 422 during which the station can transmit data.

According to a particularly advantageous embodiment, the nodes form a Wi-Fi® network, in accordance with the standard IEEE 802.11-2007, in infrastructure mode. The quiet information transmitted via the virtual access point VAP1 of the first set BSS1 is received by the station(s) 111 of the first set BSS1 and comprises an item of information prohibiting the stations of the first set from transmitting during one or several temporal intervals allocated to the second set, and generally during one or several temporal intervals allocated to the other sets of nodes of the network other than the first set. The second set of nodes BSS2 also comprises a virtual access point VAP2, different to the access point VAP1 of the first set, transmitting an item of quiet information intended for the station(s) 112 of the second set, these stations being associated with the access point of the second set for the establishment of all communication with the network. The quiet information transmitted via the access point of the second set is received by the station(s) of the second set and comprises an item of information prohibiting the stations of the second set from transmitting during one or several temporal intervals allocated to the first set, and generally during one or several temporal intervals allocated to the other sets of nodes of the network other than the second set. According to a variant, the network comprises more than two sets of nodes, each set comprising a virtual access point transmitting an item of information representative of a prohibition to transmit during one or several temporal intervals allocated to other sets of the network, the information being transmitted via each access point to the stations that are associated with it. Advantageously, the quiet information transmitted via a first virtual access point of the first set is comprised in a quiet element of a beacon frame, as defined in the standard IEEE 802.11-2007. The quiet element advantageously comprises the description of a set of specific parameters enabling the positioning of a quiet interval by the nodes or stations of the first set receiving the quiet information. This set of parameters comprises the following parameters: the quiet count, the quiet period, the quiet duration and the quiet offset. According to a variant, the beacon frame comprises several quiet elements, each quiet element comprising the description of a set of parameters specific to a quiet interval. This variant enables several quiet intervals to be positioned, notably when a communication frame is divided into n sub-frames (n≥2) and a quiet interval must be positioned per sub-frame by a given set of stations.

According to different variants, the elements of steps previously described are carried out in any order. Hence, the association of a second virtual access point with a station can be carried out before the collection of parameters and/or before the estimation of time intervals. Thus the creation of a second virtual access point can be carried out before or after the estimation of time intervals for the first virtual access point.

Naturally, the invention is not limited to the embodiments previously described.

In particular, the invention is not limited to a Wi-Fi® type network according to the standard IEEE 802.11-2007 but extends to any wired or wireless network implementing a method for accessing partially random type channel.

Advantageously, a virtual access point is not associated with a unique node for an association but with several nodes, thus isolating this set of nodes from another node.

Advantageously, the invention is not limited to embodiments previously described comprising two BSS sets each comprising a station and a virtual access point. The invention is compatible with a number of BSS greater than two, any number of stations can be regrouped in these BSS.

Advantageously, each access point transmitting an item of quiet information prohibits any transmission during the temporal interval(s) described in the quiet information.

Advantageously, when a client can communicate with the predefined heightened modulation, it obtains the expected bit rate (that is guaranteed) and when it cannot communicate with the predefined heightened modulation, it available bit rate decreases (or the number of errors increases). When a client cannot communicate with the heightened modulation, another client does not see its available bit rate affected. Thus the available bit rate of a client depends on its reception conditions and no longer depends on reception conditions of other clients of the network. The invention then has the advantage of isolating the wireless links between clients.

According to a variant, an access point transmits an item of quiet information intended for stations that are associated with it and carries out measurements during temporal interval(s) specified in the quiet information, for example for the detection of another set of nodes or BSS belonging or not to the network (known as the ESS) formed by the BSS.

Advantageously, all the sets of nodes (or BSS) forming a network (or ESS) use the same method for accessing the channel and the same communication protocols.

According to a variant, there are several temporal intervals during which all the nodes of all the node sets are prohibited from transmitting to enable one of the nodes to take a measurement, for example a detection measurement of radar interference. According to another variant, there are one or several temporal intervals during which all the nodes of all the sets are authorized to transmit, for example during a stream without quality of service for which the risks of collisions and thus loss of data must be limited.

The invention claimed is:

1. A method for establishing a first and second association between a main node and respectively a first and second wireless node, the first association associating a first virtual access point of the main node and the first node, the first virtual access point transmitting to the first node first beacon frames comprising a first item of information representative of said first association, the first virtual access point being identified by a services set identifier wherein, when the main node receives from the node a request for the establishment of the second association, the method comprises, at the level of a controller:

creating a second virtual access point of the main node transmitting to the second node second beacon frames comprising a second item of information representative of said second association, said second virtual access point being identified by the services set identifier;

initializing a total data transmission bit rate practiced by the first and second node linked to the physical modulation used by respectively the first and second node in the first and second association, initializing a first and second data transmission bit rate required by respectively the first and second node transmitted in the first and second association, and initializing a frame duration;

determining a first and a second temporal interval during which respectively the first node and the first virtual access point on one hand, the second node and the second virtual access point are prohibited from sending the second temporal interval having a frame duration that is proportional to the frame duration and proportional to the first data transmission bit rate required by the first node relative to the total data transmission bit rate, and the first temporal interval having a duration that is proportional to the frame duration and proportional to the second data transmission bit rate required by the second node relative to the total data transmission bit rate;

establishing of the second association between the second node and the second virtual access point; and transmitting, to the first node at least one item of quiet information representative of a prohibition to transmit during the first temporal interval, and to the second node at least one item of quiet information representative of a prohibition to transmit during the second temporal interval.

2. The method according to claim 1, wherein the controller sets the frame duration proportional to a ratio between the first data transmission bit rate practised by the first node and the first data transmission bit rate required by the first node, and wherein the second temporal interval has a duration proportional to the frame duration and proportional a ratio between the second data transmission bit rate practiced by the second node and the second data transmission bit rate required by the second node.

3. The method according to claim 1, wherein said main node is an access point, and in that said first and second node are associated with said access point.

4. The method according to claim 1, wherein the quiet information is comprised in at least one quiet element of a beacon frame.

5. A controller for establishing a first and second association between a main node and respectively a first and second wireless node, the first association associating a first virtual access point of the main node and the first node, the first virtual access point transmitting to the first node first beacon frames comprising a first item of information representative of said first association, the first virtual access point being identified by a services set identifier, the controller comprising:

a processor having access to memory, wherein the processor executes instructions from the memory, the executed instructions acting to:

create a second virtual access point of the main node transmitting to the second node second beacon frames comprising a second item of information representative of said second association, said second virtual access point being identified by the service set identifier;

initialize a total data transmission bit rate practiced by the first and second node linked to the physical modulation employed by respectively the first and second node in the first and second association, initialize a first and second data transmission bit rate required by respectively the first and second node in the first and second association; and initialize a frame duration;

determine a first and a second temporal interval during which respectively the first node and the first virtual access point, and the second node and the second virtual access point are prohibited from sending;

initialize a total data transmission bit rate practiced by the first and second node linked to the physical modulation used by respectively the first and second node in the first and second association, initialize a first and second data transmission bit rate required by respectively the first and second node in the first and second association; and initialize a frame duration;

establish of the second association between the second node and the second virtual access point; and a transmitter to transmit, to the first node, at least one item of quiet information representative of a prohibition to transmit during the first temporal interval, and to the second node at least one item of quiet information representative of a prohibition to transmit during the second temporal interval.

* * * * *